US009971908B2

United States Patent
Huang et al.

(10) Patent No.: US 9,971,908 B2
(45) Date of Patent: May 15, 2018

(54) METHOD AND APPARATUS FOR DETERMINING PERMISSION OF APPLICATION PROGRAM

(71) Applicant: Huawei Device (Dongguan) Co., Ltd., Dongguan (CN)

(72) Inventors: Xi Huang, Shenzhen (CN); Huangwei Wu, Shenzhen (CN)

(73) Assignee: HUAWEI DEVICE (DONGGUAN) CO., LTD., Shenzhen (CN)

( * ) Notice: Subject to any disclaimer, the term of this patent is extended or adjusted under 35 U.S.C. 154(b) by 116 days.

(21) Appl. No.: 14/966,350

(22) Filed: Dec. 11, 2015

(65) Prior Publication Data

US 2016/0098570 A1  Apr. 7, 2016

Related U.S. Application Data

(63) Continuation of application No. PCT/CN2014/084797, filed on Aug. 20, 2014.

(30) Foreign Application Priority Data

Aug. 28, 2013 (CN) .......................... 2013 1 0382219

(51) Int. Cl.
  G06F 21/62 (2013.01)
  G06F 21/60 (2013.01)

(52) U.S. Cl.
  CPC .......... *G06F 21/629* (2013.01); *G06F 21/604* (2013.01); *G06F 2221/2141* (2013.01); *G06F 2221/2145* (2013.01)

(58) Field of Classification Search
  CPC ................. G06F 21/629; G06F 21/604; G06F 2221/2141; G06F 2221/2145
  See application file for complete search history.

(56) References Cited

U.S. PATENT DOCUMENTS 6,151,643 A * 11/2000 Cheng ....................... G06F 8/62
                                                                 709/200
6,438,600 B1 * 8/2002 Greenfield .......... H04L 63/0815
                                                                 709/228

(Continued)

FOREIGN PATENT DOCUMENTS

| CN | 102289633 A | 12/2011 |
| CN | 102609267 A | 7/2012 |
| CN | 102609635 A | 7/2012 |

OTHER PUBLICATIONS

Jiang et al., A security assessment method for Android applications based on permission model, Oct. 2012, IEEE 2nd International Conference on Cloud Computing and Intelligent Systems, pp. 701-705 (Year: 2012).*

(Continued)

*Primary Examiner* — Kenneth W Chang
(74) *Attorney, Agent, or Firm* — Conley Rose, P.C.

(57) ABSTRACT

A method for determining a permission of an application program is presented. The method for determining a permission of an application program in the present disclosure includes receiving an installation request of a first application, where the installation request carries a first permission list that the first application applies for and a first shared user identifier requested by the first application; searching, according to the first shared user identifier, for at least one second application that uses the first shared user identifier and is already installed in a system; and if the first application is a plug-in of the second application already installed in the system, determining a permission of the first application according to the first permission list that the first application applies for and a permission in a second permission list corresponding to the first shared user identifier.

17 Claims, 4 Drawing Sheets

(56) References Cited

U.S. PATENT DOCUMENTS

| | | | |
|---|---|---|---|
| 7,149,510 B2* | 12/2006 | Hansson | G06F 9/468 |
| | | | 455/418 |
| 2001/0051925 A1* | 12/2001 | Kang | G06F 21/10 |
| | | | 705/51 |
| 2008/0189793 A1 | 8/2008 | Kirkup et al. | |
| 2009/0144758 A1* | 6/2009 | Murakawa | G06F 9/4443 |
| | | | 719/328 |
| 2011/0320956 A1* | 12/2011 | Singh | G06Q 30/0241 |
| | | | 715/747 |
| 2012/0096544 A1 | 4/2012 | Hosoda | |
| 2012/0246701 A1 | 9/2012 | Swamy et al. | |

OTHER PUBLICATIONS

Barrera, D., et al., "Understanding and Improving App Installation Security Mechanisms through Empirical Analysis of Android," Proceedings of the Second ACM Workshop on Security and Privacy in Smartphones and Mobile Devices, Oct. 19, 2012, 12 pages.

Foreign Communication From a Counterpart Application, European Application No. 14840964.2, Extended European Search Report dated Jun. 2, 2016, 8 pages.

Foreign Communication From a Counterpart Application, Chinese Application No. 201310382219.8, Chinese Search Report dated Dec. 16, 2016, 2 pages.

Foreign Communication From a Counterpart Application, Chinese Application No. 201310382219.8, Office Action dated Dec. 26, 2016, 7 pages.

Partial English Translation and Abstract of Chinese Patent Application No. CN102289633, Apr. 5, 2016, 4 pages.

Wei, W., "The System based on the Android Principle Analysis of Malicious Program," Oct. 2012, 6 pages.

English Translation of Wei, W., "The System based on the Android Principle Analysis of Malicious Program," Oct. 2012, Retrieved on Apr. 6, 2016, 2 pages.

Foreign Communication From a Counterpart Application, PCT Application No. PCT/CN2014/084797, English Translation of International Search Report dated Nov. 19, 2014, 2 pages.

Foreign Communication From a Counterpart Application, PCT Application No. PCT/CN2014/084797, English Translation of Written Opinion dated Nov. 19, 2014, 7 pages.

* cited by examiner

METHOD AND APPARATUS FOR DETERMINING PERMISSION OF APPLICATION PROGRAM

CROSS-REFERENCE TO RELATED APPLICATIONS

This application is a continuation of International Application No. PCT/CN2014/084797, filed on Aug. 20, 2014, which claims priority to Chinese Patent Application No. 201310382219.8, filed on Aug. 28, 2013, both of which are hereby incorporated by reference in their entireties.

TECHNICAL FIELD

Embodiments of the present disclosure relate to the field of information technologies, and in particular, to a method and an apparatus for determining a permission of an application program.

BACKGROUND

An Android system is becoming one of the most popular application platforms worldwide. Development of an Android platform is one of its numerous advantages, and the platform for development allows any mobile terminal manufacturer to participate in development of Android applications. Prominent openness allows the Android platform to have more developers, and as users and applications gradually increase, the applications of the Android platform become plentiful. These different applications can meet various needs of different users, and give users more experience.

The Android operating system has a mechanism of shared user identifier (sharedUserId): after an installation package .apk file of an application is installed in the system, the application downloads an application plug-in in the background, and prompts a user to install the downloaded application plug-in; if the user chooses to install the plug-in and the application plug-in requests to share a user identifier, it is determined whether the same sharedUserId is already recorded in a current packages.xml file of the system, and if the same sharedUserId is already recorded in the current packages.xml file, information about a signature certificate corresponding to the existing sharedUserId is extracted; and when the information about the signature certificate is consistent with that of the to-be-installed application, the to-be-installed application is allowed to share the same sharedUserId with an already installed application, and all permissions that the to-be-installed application applies for are extracted and are added to a permission list of the sharedUserId; in this way, the to-be-installed application can share one sharedUserId with the already installed application, thereby achieving an objective of sharing a permission with the already installed application, and the original application also obtains all permissions of the new application.

When a newly installed application shares a sharedUserId with an already installed application, if a user chooses to install the new application, the previously installed application obtains all permissions of the newly installed application. Because in the Android system, an application can access information, such as an address book, a short message service message, or a picture, of a user by applying for a corresponding permission, after installing the new application, the user cannot learn a risk brought by adding, by the newly installed application, a permission to the already installed application, thereby lowering security.

SUMMARY

Embodiments of the present disclosure provide a method and an apparatus for determining a permission of an application program, which make an application unable to add a permission of the application by adding a plug-in, lowering a risk of a system.

A first aspect of the embodiments of the present disclosure provides a method for determining a permission of an application program, including receiving an installation request of a first application, where the installation request carries a first permission list that the first application applies for and a first shared user identifier requested by the first application; searching, according to the first shared user identifier, for at least one second application that uses the first shared user identifier and is already installed in a system; and if the first application is a plug-in of the second application already installed in the system, determining a permission of the first application according to the first permission list that the first application applies for and a permission in a second permission list corresponding to the first shared user identifier.

In a first possible implementation manner of the first aspect, the determining the permission of the first application according to the first permission list that the first application applies for and the permission in the second permission list corresponding to the first shared user identifier includes determining all permissions in the second permission list in the system as the permissions of the first application; or determining a permission, which exists in the second permission list, in the first permission list as the permission of the first application; or determining all permissions in the first permission list as the permissions of the first application.

With reference to the first possible implementation manner of the first aspect, in a second possible implementation manner of the first aspect, after the determining the permission of the first application according to the first permission list that the first application applies for and the permission in the second permission list corresponding to the first shared user identifier, the method further includes adding information about the first application to an installation file of the system, and adding the first shared user identifier to the information about the first application.

With reference to the first aspect, in a third possible implementation manner of the first aspect, after the searching, according to the first shared user identifier, for the second application that uses the first shared user identifier and is already installed in the system, the method further includes, if the first application is not the plug-in of the second application or the first application is not from an official market, allocating a second shared user identifier to the first application, and determining a permission that the first application applies for, as the permission of the first application.

With reference to the third possible implementation manner of the first aspect, in a fourth possible implementation manner of the first aspect, after the allocating the second shared user identifier to the first application, and determining the permission that the first application applies for, as the permission of the first application, the method further includes setting label information in an installation file of the system, where the label information is used for indicating that the first application does not use the first shared user identifier.

With reference to the third or fourth possible implementation manner of the first aspect, in a fifth possible implementation manner of the first aspect, after the allocating the second shared user identifier to the first application, and determining the permission that the first application applies for, as the permission of the first application, the method further includes adding information about the first application to the installation file of the system.

With reference to any one of the first to fifth possible implementation manners of the first aspect, in a sixth possible implementation manner of the first aspect, before the determining the permission of the first application according to the first permission list that the first application applies for and the permission in the second permission list corresponding to the first shared user identifier, the method further includes determining that signature certificates of the first application and the second application are the same.

A second aspect of the embodiments of the present disclosure provides an apparatus for determining a permission of an application program, including a receiving module configured to receive an installation request of a first application, where the installation request carries a first permission list that the first application applies for and a first shared user identifier requested by the first application; a searching module configured to search, according to the first shared user identifier, for at least one second application that uses the first shared user identifier and is already installed in a system; and a processing module configured to, if the first application is a plug-in of the second application already installed in the system, determine a permission of the first application according to the first permission list that the first application applies for and a permission in a second permission list corresponding to the first shared user identifier.

In a first possible implementation manner of the second aspect, the processing module is configured to determine all permissions in the second permission list as the permissions of the first application; or determine a permission, which exists in the second permission list, in the first permission list as the permission of the first application; or determine all permissions in the first permission list as the permissions of the first application.

With reference to the first possible implementation manner of the second aspect, in a second possible implementation manner of the second aspect, the processing module is further configured to add information about the first application to an installation file of the system, and add the first shared user identifier to the information about the first application.

With reference to the second aspect, in a third possible implementation manner of the second aspect, after it is determined whether the first application is the plug-in of the second application already installed in the system is determined, the processing module is further configured to, if the first application is not the plug-in of the second application or the first application is not from an official market, allocate a second shared user identifier to the first application, and determine a permission that the first application applies for, as the permission of the first application.

With reference to the third possible implementation manner of the second aspect, in a fourth possible implementation manner of the second aspect, after the allocating the second shared user identifier to the first application, and determining the permission that the first application applies for, as the permission of the first application, the processing module is further configured to set label information in an installation file of the system, where the label information is used for indicating that the first application does not use the first shared user identifier.

With reference to the third or fourth possible implementation manner of the second aspect, in a fifth possible implementation manner of the second aspect, after the allocating the second shared user identifier to the first application, and determining a permission that the first application applies for, as the permission of the first application, the processing module is further configured to add information about the first application to the installation file of the system.

With reference to any one of the first to fifth possible implementation manners of the second aspect, in a sixth possible implementation manner of the second aspect, before the determining the permission of the first application according to the first permission list that the first application applies for and the permission in the second permission list corresponding to the first shared user identifier, the processing module is further configured to determine that signature certificates of the first application and the second application are the same.

A third aspect of the embodiments of the present disclosure provides an apparatus for determining a permission of an application program, including a memory and a processor, where the memory communicates with the processor, the memory stores program code, and the processor is configured to invoke the program code stored in the memory, to perform the method according to any one of the first to fifth possible implementation manners of the first aspect.

According to the method and apparatus for determining a permission of an application program in the embodiments of the present disclosure, for an installation request of an application plug-in of an already installed application, a permission of the application plug-in is determined according to a permission that the application plug-in applies for and a permission list corresponding to a shared user identifier of the already installed application, thereby improving security of a system.

BRIEF DESCRIPTION OF DRAWINGS

To describe the technical solutions in the embodiments of the present disclosure more clearly, the following briefly introduces the accompanying drawings required for describing the embodiments or the prior art. Apparently, the accompanying drawings in the following description show some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
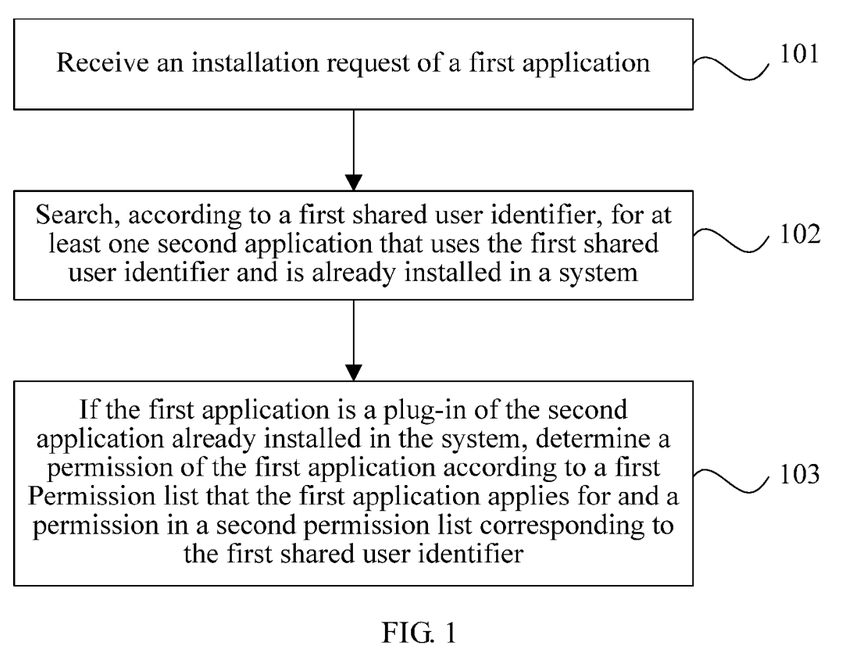
FIG. 1 is a flowchart of Embodiment 1 of a method for determining a permission of an application program according to the present disclosure.

FIG. 1 is a flowchart of Embodiment 1 of a method for determining a permission of an application program according to the present disclosure. As shown in FIG. 1, the method for determining a permission of an application program provided in this embodiment of the present disclosure is applicable to various user equipment, such as a mobile phone, a personal computer (PC), and a tablet computer (PAD). The method embodiment is executed by a module or a unit having a processing function, such as a central processing unit (CPU), in the foregoing terminal devices. The method in this embodiment may include the following.

Step 101: Receive an installation request of a first application.

The installation request of the first application carries a first permission list that the first application applies for and a first shared user identifier.

Step 102: Search, according to a first shared user identifier, for at least one second application that uses the first shared user identifier and is already installed in a system.

This embodiment of the present disclosure is applicable to various operating systems, for example, various types of operating systems such as a Microsoft operating system and an Android operating system. Involved permissions generally may refer to various access permissions, for example, a permission for an operation of accessing an address book, a short message service message, or a picture of a user. If two or more applications use a same sharedUserId, these applications also share permissions.

A second application refers to an application already installed in the system, and after being installed in the system, the second application downloads various plug-ins of the second application, and prompts the user to install the plug-ins. The installation request, with which the system is prompted, of the first application carries a permission that the first application applies for.

Because an application and a plug-in of the application have a same shared identifier (sharedUserId), at least one application that uses the first shared user identifier and is recorded in the system, that is, a second application, may be found according to the first shared user identifier (sharedUserId) of the first application. There may be one or more second applications.

For a corresponding second application already installed in the system, the second application may be found by searching for an application whose shared identifier in a packages.xml file is the same as that of the first application. It should be noted that, an installation package .apk (android package) file of the first application may include content, such as a resource file, data, a configuration file, an executable file, signature information, and information about a certificate used for signing, of the application. Description is made below using an .apk file of an Android system as an example, and the .apk file includes the following:

```
S.Apk
  --res (resource file)
  --META-INF (signature information and a file directory of a certificate used for signing)
    ----Manifest.xml (hash table)
    ----CERT.SF (hashing on a hash value in Manifest)
    ----CERT.RSA (a hash value after signing and information about a certificate used for signing)
  --lib (a directory of a library file)
  --assets (a directory of a compiled resource file)
  --classes.dex (an executable file of an application)
  --AndroidManifest.xml (a list file of an application)
```

The foregoing directory structure is only an example, and during specific implementation, some .apk files may not have one or some files or directories in the foregoing directory.

In the Android operating system, a permission that an application needs to use needs to be defined in an AndroidManifest.xml file in an installation package of the application, as shown in the following:

<uses-permission android:name="SEND_SMS"/>.

The foregoing definition indicates that the application applies for use of a permission for sending a short message service message.

A sharedUserId of the application is also defined in the foregoing file, as shown in the following:

```
<manifest xmlns:android="http://schemas.android.com/apk/res/android"
Package="com.test.activitynew"
android:versionCode="2"
android:versionName="2.0"
android:shareUserId="com.test.activity">.
```

The foregoing sharedUserId="com.test.activity" indicates that the sharedUserId of the application is com.test.activity.

A configuration file may include a name of an application, a permission that an application needs to apply for, and the like, and information about a certificate used for signing includes a public key of the certificate, an index of the certificate, information about an owner of the certification, an encryption algorithm of the certificate, and the like.

Optionally, during installation, the system may further scan and analyze information about the application, to determine whether the first application is from an official market.

Step 103: If the first application is a plug-in of the second application already installed in the system, determine a permission of the first application according to a first permission list that the first application applies for and a permission in a second permission list corresponding to the first shared user identifier.

As a feasible implementation manner, all permissions in the second permission list may be determined as the permissions of the first application.

As another feasible implementation manner, a permission, which exists in the second permission list, in the first permission list may also be determined as the permission of the first application.

As still another feasible implementation manner, with consent of a user, or in a case in which the system determines that there is no risk, all permissions in the first permission list may also be determined as the permissions of the first application.

According to the method and apparatus for determining a permission of an application program in this embodiment of the present disclosure, for an installation request of an application plug-in of an already installed application, a permission of the application plug-in is determined according to a permission that the application plug-in applies for and a permission list corresponding to a shared user identifier of the already installed application, thereby improving security of a system.

The technical solution of the method embodiment shown in FIG. 1 is described below in detail using a specific embodiment. It is assumed that a second application X is already installed in a system, and a permission list corresponding to a first shared user identifier com.app.X of the second application X includes permissions a1, a2, a3, and a4. After the second application X is installed, a plug-in, that is, a first application Y is installed in the background of the system, and permissions that the first application Y applies for are a2, a3, a4, and a5. It may be determined whether Y is from an official market, if yes, it may further be determined whether Y is a plug-in of X, and if yes, all the permissions a1, a2, a3, and a4 in the permission list corresponding to com.app.X in the system may be determined as permissions of Y; or the permissions a2, a3, and a4, which exist in the permission list, among the permissions that the first application applies for may be determined as permissions of Y, or with consent of a user or in a case in which the system determines that there is no risk, the permissions a2, a3, a4, and a5 may be determined as permissions of Y. If it is determined that Y is not from the official market or is not a plug-in of X, a second shared user identifier may be allocated to Y, and only the permissions a2, a3, a4, and a5 that are required by the application Y are granted.

Figure 2:
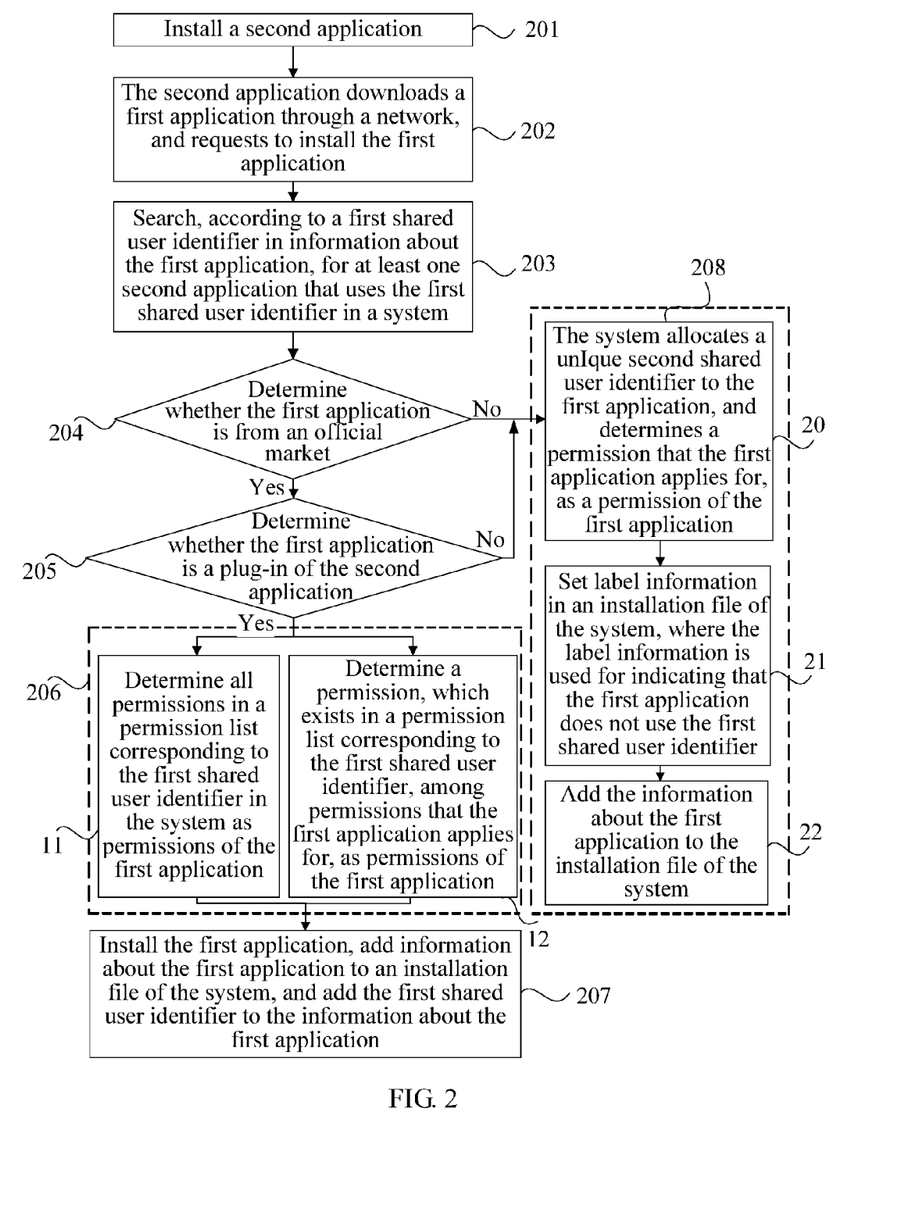
FIG. 2 is a flowchart of Embodiment 2 of a method for determining a permission of an application program according to the present disclosure.

FIG. 2 is a flowchart of Embodiment 2 of a method for determining a permission of an application program according to the present disclosure. As shown in FIG. 2, based on the embodiment shown in FIG. 1, this embodiment provides the method for determining a permission of an application program and a specific process of installing a plug-in. The method in this embodiment may include:

Step 201: Install a second application.

An extension of an installation file on an Android platform is generally ".apk" (there are also some application software in an rar or zip format, which need to be decompressed before installation). There are a total of three commonly used methods for installing an application on the Android platform, which are: (1) an application is downloaded from a Market, which is also referred to as an electronic market, of an Android system for installation; (2) if an "APK installer" already exists in a device of a user, a related installation package of an application may be directly selected using the "APK installer", so as to install the application; if the device of the user does not have the APK installer, the user may choose to download a software installer; and (3) an application is installed on a computer using a universal serial bus (USB) connection.

First, a user selects an appropriate installation manner according to a requirement to install the second application in the system.

Step 202: The second application downloads a first application through a network, and requests to install the first application.

When the user runs the second application, the second application downloads the first application in the background, and requests to install the first application. An installation request of the first application carries a permission that the first application applies for.

Step 203: Search, according to a first shared user identifier in information about the first application, for at least one second application that uses the first shared user identifier in a system.

Step 204: Determine whether the first application is from an official market.

To determine whether the first application is from the official market, the following manners are generally available: (1) an about option/menu of the first application is checked, to find a website of the official market, an installation file *.apk is downloaded, the website of the official market is found using a search engine, and comparison is performed; (2) application information, such as a software name, an application package name, a software version, a file size, and a software permission, of the first application is acquired using an application assistant, to determine whether the first application is from the official market; (3) it is determined through comparison whether application attributes of an application *.apk downloaded from an official website and the first application downloaded through a network are consistent, so as to determine whether the first application is from the official website; and (4) signature information of the first application and a hash value of a file in an installation package are transmitted to an application server (which may be Google Play, or may be a third-party server) to compare a signature and the hash value.

Step 205: Determine whether the first application is a plug-in of the second application.

To determine whether the first application is a plug-in of the second application, the following methods are generally available: (1) it is detected whether it is defined in a configuration file that the first application is a plug-in; (2) it is checked whether the first application generates an application icon and the like, and in this manner, it may be determined whether the first application is a plug-in; and (3) it is checked whether an activity defined as <category android:name="android.intent.category.LAUNCHER"/> exists in the configuration file of the first application.

Step 206: Determine a permission of the first application.

In this embodiment, there are two manners for determining, using the system, a permission granted to the first application, and step 206 further includes two specific steps as follows:

Step 11: Determine all permissions in a permission list corresponding to the first shared user identifier in the system as the permissions of the first application.

Step 12: Determine a permission, which exists in a permission list corresponding to the first shared user identifier, among permissions that the first application applies for, as the permission of the first application.

Step 207: Install the first application, add information about the first application to an installation file of the system, and add the first shared user identifier to the information about the first application.

The installation file of the system is an installation information record file such as packages.xml and package.list.

Step 208: When the first application is not from the official market and/or is not a plug-in of the second application, determine a permission.

After it is determined in step 203 and step 204 that the first application is not from the official market or is not a plug-in of the second application, a processing method for installing the first application by a user further includes the following steps:

Step 20: The system allocates a unique second user identifier to the first application, and determines a permission that the first application applies for, as the permission of the first application.

Step 21: Set label information in an installation file of the system, where the label information is used for indicating that the first application does not use the first shared user identifier.

Step 22: Add the information about the first application to the installation file of the system.

According to the steps in FIG. 2, it is assumed that a second application A is installed in an Android system, and permissions corresponding to a first shared user identifier com.app.A of the second application A are P1 and P2, as shown in the following:

```
<packagename="com.huawei.android.remotecontrol"
  codePath="/system/app/PhoneFinder.apk"
nativeLibraryPath="/data/data/com.huawei.android.remotecontrol/lib"
flags="1"
  ft="137c481adb0" it="137c481adb0" ut="137c481adb0" version="2206"
  sharedUserId="1001">.
```

The second application A is installed, the second application A downloads a first application B in the background of the system, the application B applies for permissions P2, P3, and P4, and the second application A requests to install the second application B.

The system responds to the request for installing the first application B from the second application A, starts a system installer to install the first application B, and first detects whether the first application B is from an official market. Information such as an application signature certificate and a package name of the first application B is uploaded to the official market for checking and comparison. If the checking succeeds, the first application B is an application from the official market; otherwise, the first application B is not an application from the official market.

If the first application is from the official market, it may further be determined whether the first application B is a plug-in of the second application A, and a specific determining method may be, during installation, it is required to define in the configuration file of the first application whether the first application is a plug-in, where a format of the definition may be as follows:

```
<app-plug android:name="true">
  <parent-app android:name="parent_app_name" />
</app-plug>.
```

When an app-plug label is detected and an attribute value of the label is true, it may be determined that the first application is a plug-in; otherwise, the first application is not a plug-in.

In addition, it may be determined, by checking whether the first application B generates a corresponding application icon, whether the first application B is a plug-in, that is, whether the first application B may independently; a method for checking whether the first application B generates an application icon may be checking whether there is an activity in which a <category android:name="android.intent.category.LAUNCHER"/> attribute is set.

If there is an activity in which the attribute is set, it indicates that the first application B generates an application icon; otherwise, the first application B does not generate an application icon. If the first application B can generate a corresponding application icon, the first application B is not a plug-in of the second application A; otherwise, the first application B is a plug-in of the second application A.

If the first application B is a plug-in of the second application A, the system has three manners of determining a permission of the first application B: (1) new permissions that the first application B applies for are ignored, and only a permission in a permission list of a corresponding sharedUserId recorded in the system is granted to the first application B, that is, only permissions P1 and P2 are granted to the first application B; (2) a permission, which exists in the permission list of the sharedUserId, among the permissions that the first application B applies for is granted according to the new permissions that the first application B applies for, that is, the permission P2 is granted to the first application B; and (3) with consent of a user or in a case in which the system determines that there is no risk, the permissions that the first application B applies for are granted to the first application B, that is, permissions P2, P3, and P4 are granted.

Optionally, after it is determined that the first application B is a plug-in of the second application A, the system may also display the foregoing two processing solutions to the user, and it is determined by the user to choose to use which processing manner. A method for informing the user may be popping up a dialog box, and displaying the two processing manners, to prompt the user to select one.

After the permission is determined, the first application B is installed, related information of the first application B is recorded, and the corresponding sharedUserId is added to a record of the application B as follows:

<SharedUserId android:name="com.app.A"/>.

If it is determined that the first application B is not from the official market or the first application B is not a plug-in of the second application A, the following processing is performed on the first application B: (1) extracting and processing information in an installation package of the application, ignoring sharedUserId information, and allocating a unique UserId to the first application B; and (2) installing the first application B, and when the system completes installation and records information about the first application B, adding a label to a packages.xml file, to mark the first application B as an excluded sharedUserId application as follows:

<disable-shareduid-app android:name="app_B"/>.

When the system starts, when sharedUserId information is found, by means of scanning, in the installation package of the first application B, once the packages.xml file includes a record of the label, the sharedUserId information is ignored, the first application B is not added to a record whose sharedUserId is com.app.A, and the first application B does not obtain a permission in the permission list of com.app.A.

Finally, the information about the first application B is recorded in the packages.xml file, to complete installation of an application.

According to the method and apparatus for determining a permission of an application program in this embodiment of the present disclosure, for an installation request of an application plug-in of an already installed application, a permission of the application plug-in is determined according to a permission that the application plug-in applies for and a permission list corresponding to a shared user identifier of the already installed application. A user is informed of an installation risk of a new application, thereby improving security of a system.

Figure 3:
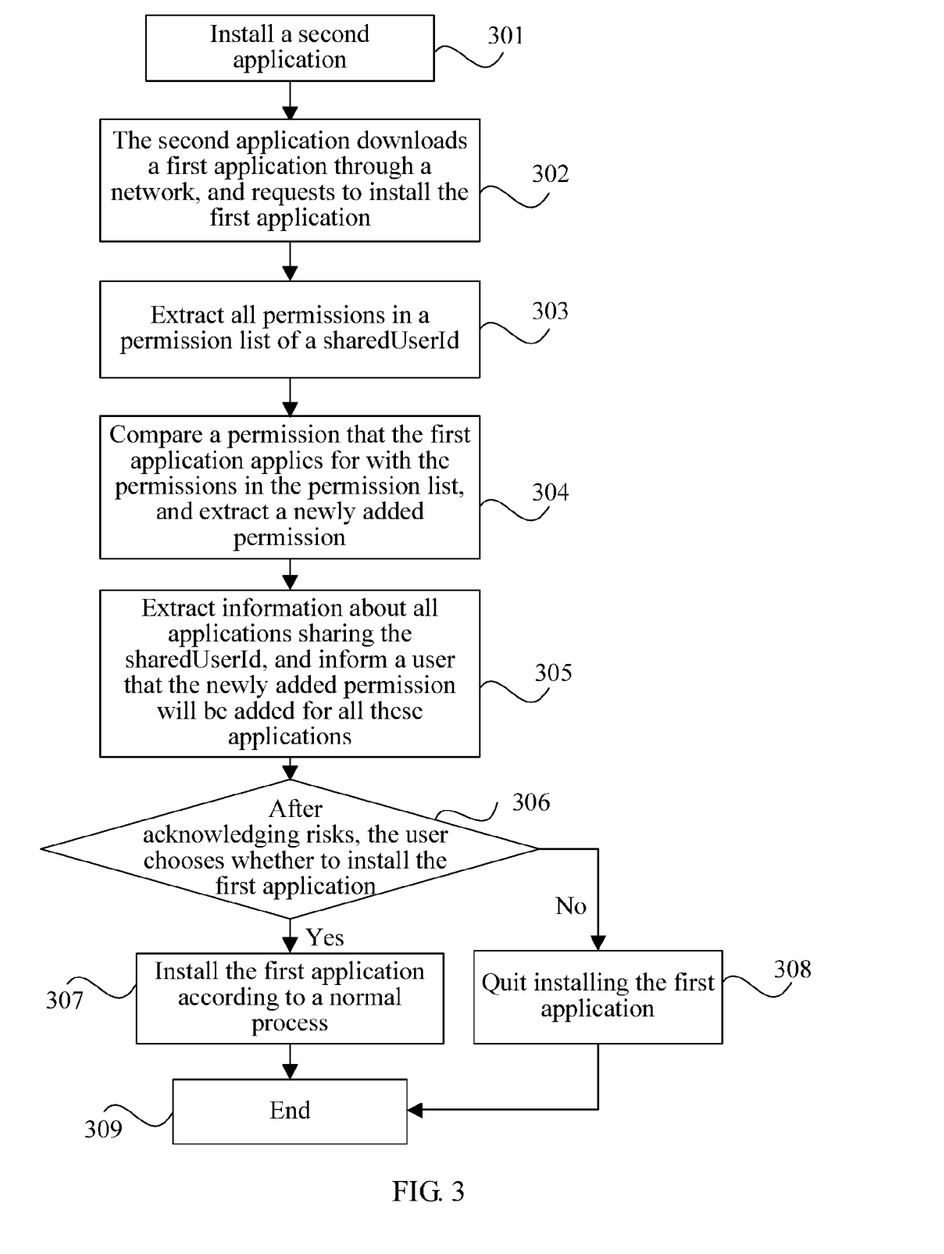
FIG. 3 is a flowchart of Embodiment 3 of a method for determining a permission of an application program according to the present disclosure.

FIG. 3 is a flowchart of Embodiment 3 of a method for determining a permission of an application program according to the present disclosure. As shown in FIG. 3, a difference between this embodiment and the embodiment shown in FIG. 2 is that in this embodiment, a user is prompted that installing a first application increases risks, and it is determined by the user to choose whether to install the first application. The method in this embodiment may include:

Step 301: Install a second application, and record related information of the second application.

In this embodiment, it is assumed that the second application is A, and a first application is B. The related information includes, but is not limited to, a name of the second application A, a sharedUserId of the second application A, permission information of the second application A, and the like; it is assumed that sharedUserId information of the second application A is as follows:

<sharedUserId android:name="com.app.A">; and the permission information is as follows:

```
<perm>
    <item android:name="android:permission.P1" />
    <item android:name="android:permission.P2" />
</perm>.
```

If the second application A includes sharedUserId information, the sharedUserId information, including information about a permission list of the sharedUserId, is added to a record file packages.xml of a system.

Step 302: The second application downloads a first application through a network, and requests to install the first application.

Information about the first application B includes, but is not limited to, a name of the first application B, sharedUserId information of the first application B, and permission information of the first application B. For a form in which the information is recorded, refer to the form in which the information about the second application A is recorded in step 301.

It is determined, according to the sharedUserId information of the first application B and the sharedUserId information recorded in the system, whether the first application B shares a same sharedUserId with another application in the system.

Step 303: Extract all permissions in a permission list of a sharedUserId.

An example for a method for extracting a newly added permission is as follows:

the permission list of the sharedUserId recorded in packages.xml of the system is as follows:

```
<perm>
    <item android:name="android:permission.P1" />
    <item android:name="android:permission.P2" />
</perm>.
```

Step 304: Compare a permission that the first application applies for with the permissions in the permission list, and extract a newly added permission.

Recorded information about a permission list of the first application B is as follows:

```
<perm>
    <item android:name="android:permission.P1" />
    <item android:name="android:permission.P3" />
</perm>;
``` then, the newly added permission is <item android:name="android:permission.P3"/>.

Step 305: Extract information about all applications sharing the sharedUserId, and inform a user that the newly added permission will be added for all these applications.

A specific method for extracting the information about all the applications sharing the sharedUserId is searching, according to a record in packages.xml, for an application whose sharedUserId is recorded as "com.app.A".

A method for informing a user may be popping up a dialog box, and displaying information about each of the foregoing found applications or applications whose package names are com.app.A, where the information may be any or a combination of a name of an application, a permission that an application already has, an installation location of an application, and the like, adding information about a permission P3 to prompt information, and displaying the prompt information to the user.

Step 306: After acknowledging risks, the user choose whether to install the first application.

If the user chooses to install the first application, step 307 is performed, and if the user chooses not to install the first application, step 308 is performed.

Step 307: Install the first application according to a normal process.

Step 308: Quit installing the first application.

Step 309: End.

According to the method and apparatus for determining a permission of an application program in this embodiment of the present disclosure, for an installation request of an application plug-in of an already installed application, a user is reminded of an installation risk according to a permission that the application plug-in applies for and a permission list corresponding to a shared user identifier of the already installed application, thereby improving security of a system.

Figure 4:
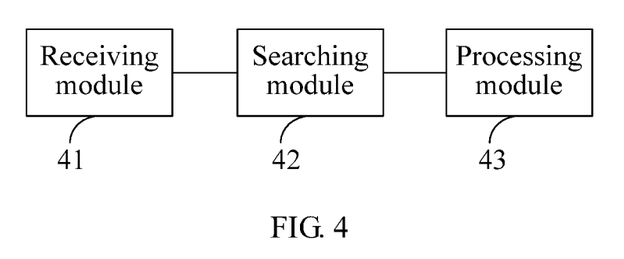
FIG. 4 is a schematic structural diagram of an embodiment of an apparatus for determining a permission of an application program according to the present disclosure.

FIG. 4 is a schematic structural diagram of an embodiment of an apparatus for determining a permission of an application program according to the present disclosure. As shown in FIG. 4, the apparatus in this embodiment may include a receiving module 41 configured to receive an installation request of a first application, where the installation request carries a first permission list that the first application applies for and a first shared user identifier requested by the first application; a searching module 42 configured to search, according to the first shared user identifier, for at least one second application that uses the first shared user identifier and is already installed in a system; and a processing module 43 configured to, if the first application is a plug-in of the second application already installed in the system, determine a permission of the first application according to the first permission list that the first application applies for and a permission in a second permission list corresponding to the first shared user identifier.

Optionally, the processing module 43 is configured to determine all permissions in the second permission list in the system as the permissions of the first application; or determine a permission, which exists in the second permission list, in the first permission list as the permission of the first application; or determine all permissions in the first permission list as the permissions of the first application.

Optionally, the processing module 43 is further configured to add information about the first application to an installation file of the system, and add the first shared user identifier to the information about the first application.

Optionally, the processing module 43 is further configured to, if the first application is not a plug-in of the second application or the first application is not from an official market, allocate a second shared user identifier to the first application, and determine a permission that the first application applies for, as the permission of the first application.

Optionally, after allocating the second shared user identifier to the first application and determining the permission that the first application applies for, as the permission of the first application, the processing module 43 is further configured to set label information in an installation file of the system, where the label information is used for indicating that the first application does not use the first shared user identifier.

Optionally, after allocating the second shared user identifier to the first application and determining the permission that the first application applies for, as the permission of the first application, the processing module 43 is further configured to add the information about the first application to the installation file of the system.

Optionally, after receiving the installation request of the first application, the apparatus for determining a permission of an application program provided in the present disclosure is further configured to determine, according to whether a signature certificate of the first application is consistent with a signature certificate of the second application, whether the first application is a plug-in of the second application; and if the signature certificate of the first application is consistent with the signature certificate of the second application, determine that the first application is a plug-in of the second application.

The apparatus for determining a permission of an application program provided in this embodiment is corresponding to the method embodiments provided in FIG. 1, FIG. 2, and FIG. 3 of the present disclosure, and is configured to perform the technical solutions of the method embodiments shown in FIG. 1, FIG. 2, and FIG. 3. For a method for determining a permission by the apparatus, the principles, and technical effects, reference may be made to the method embodiments, and details are not described herein again.

Figure 5:
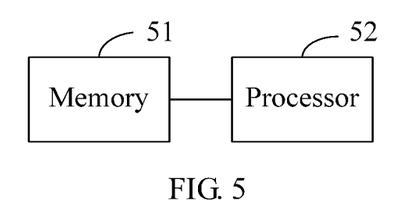
FIG. 5 is a schematic structural diagram of another embodiment of an apparatus for determining a permission of an application program according to the present disclosure.

FIG. 5 is a schematic structural diagram of another embodiment of an apparatus for determining a permission of an application program according to the present disclosure. As shown in FIG. 5, the apparatus includes a memory 51 and a processor 52. The memory communicates with the processor, the processor stores program code, and the processor is configured to invoke the program code stored in the memory, to perform the technical solutions of the method embodiments shown in FIG. 1, FIG. 2, and FIG. 3. For a method for determining a permission by the apparatus, the principles, and technical effects, reference may be made to the method embodiments, and details are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read-only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method for determining a permission of an application program, comprising:
   receiving an installation request for an initial installation of a first application, wherein the installation request includes both a first permission list of permissions applied for by the first application and a first user identifier requested by the first application;
   searching, according to the installation request for the first user identifier requested by the first application, for at least one second application installed in a system that uses the first user identifier; and
   determining, when the first application is a plug-in of the second application installed in the system, a permission of the first application according to the first permission list applied for by the first application and a permission in a second permission list corresponding to the first user identifier;
   adding information about the first application to an installation file of the system after determining the permission of the first application;
   adding the first user identifier to the information about the first application; and
   installing the first application using a system installer.

2. The method according to claim 1, wherein determining the permission of the first application according to the first permission list applied for by the first application and the permission in the second permission list corresponding to the first user identifier comprises determining all permissions in the second permission list as the permissions of the first application.

3. The method according to claim 1, wherein determining the permission of the first application according to the first permission list applied for by the first application and the permission in the second permission list corresponding to the first user identifier comprises determining a permission, which exists in the second permission list, in the first permission list as the permission of the first application.

4. The method according to claim 1, wherein determining the permission of the first application according to the first permission list applied for by the first application and the permission in the second permission list corresponding to the first user identifier comprises determining all permissions in the first permission list as the permissions of the first application.

5. The method according to claim 1, wherein, after searching, according to the first user identifier, for the second application that uses the first user identifier and is installed in the system, the method further comprises:
   allocating, when the first application is not the plug-in of the second application or the first application is not from an official market, a second user identifier to the first application; and determining a permission that the first application applies for, as the permission of the first application.

6. The method according to claim 5, wherein, after allocating the second user identifier to the first application, and determining the permission applied for by the first application, the method further comprises setting label information in an installation file of the system, wherein the label information is used for indicating that the first application does not use the first user identifier.

7. The method according to claim 5, wherein, after allocating the second user identifier to the first application, and determining the permission applied for by the first application, the method further comprises adding information about the first application to an installation file of the system.

8. The method according to claim 1, wherein, before determining the permission of the first application according to the first permission list applied for by the first application and the permission in the second permission list corresponding to the first user identifier, the method further comprises determining that signature certificates of the first application and the second application are same.

9. An apparatus for determining a permission of an application program, comprising:
a memory comprising instructions;
a processor coupled to the memory;
a receiver coupled to the processor and configured to receive an installation request for an initial installation of a first application, wherein the installation request includes a first permission list applied for by the first application and a first user identifier requested by the first application and wherein the processor is configured to:
search, according to the installation request for the first user identifier requested by the first application, for at least one second application installed in a system that uses the first user identifier;
determine, when the first application is a plug-in of the second application installed in the system, a permission of the first application according to the first permission list applied for by the first application and a permission in a second permission list corresponding to the first user identifier;
add information about the first application to an installation file of the system;
add the first user identifier to the information about the first application; and
install the first application using a system installer.

10. The apparatus according to claim 9, wherein the processor is further configured to determine all permissions in the second permission list as the permissions of the first application.

11. The apparatus according to claim 9, wherein the processor is further configured to determine a permission, which exists in the second permission list, in the first permission list as the permission of the first application.

12. The apparatus according to claim 9, wherein the processor is further configured to determine all permissions in the first permission list as the permissions of the first application.

13. The apparatus according to claim 9, wherein the processor is further configured to:
allocate, when the first application is not the plug-in of the second application or the first application is not from an official market, a second user identifier to the first application; and
determine a permission that the first application applies for, as the permission of the first application.

14. The apparatus according to claim 13, wherein, after allocating the second user identifier to the first application, and determining the permission applied for by the first application, the processor is further configured to set label information in an installation file of the system, wherein the label information is used for indicating that the first application does not use the first shared user identifier.

15. The apparatus according to claim 13, wherein, after allocating the second user identifier to the first application, and determining the permission applied for by the first application, the processor is further configured to add information about the first application to an installation file of the system.

16. The apparatus according to claim 9, wherein, before determining the permission of the first application according to the first permission list applied for by the first application and the permission in the second permission list corresponding to the first user identifier, the processor is further configured to determine that signature certificates of the first application and the second application are same.

17. An apparatus for determining a permission of an application program, comprising:
a memory storing instructions; and
a processor in communication with the memory, wherein the instructions cause the processor to be configured to:
receive an installation request for an initial installation of a first application, wherein the installation request includes a first permission list applied for by the first application and a first user identifier requested by the first application;
search, according to the installation request for the first user identifier requested by the first application, for at least one second application installed in a system that uses the first user identifier;
determine whether the first application is a plug-in of the at least one second application installed in the system;
determine a permission of the first application according to the first permission list applied for by the first application and a permission in a second permission list corresponding to the first user identifier;
allocate a second user identifier to the first application, wherein the first application is not the plug-in of the at least one second application;
allocate a permission that the first application applies for as the permission of the first application; and
install the first application using a system installer.

* * * * *